July 20, 1965  D. A. MURRAY ETAL  3,195,652
DISK HARROW
Filed April 17, 1963  3 Sheets-Sheet 1
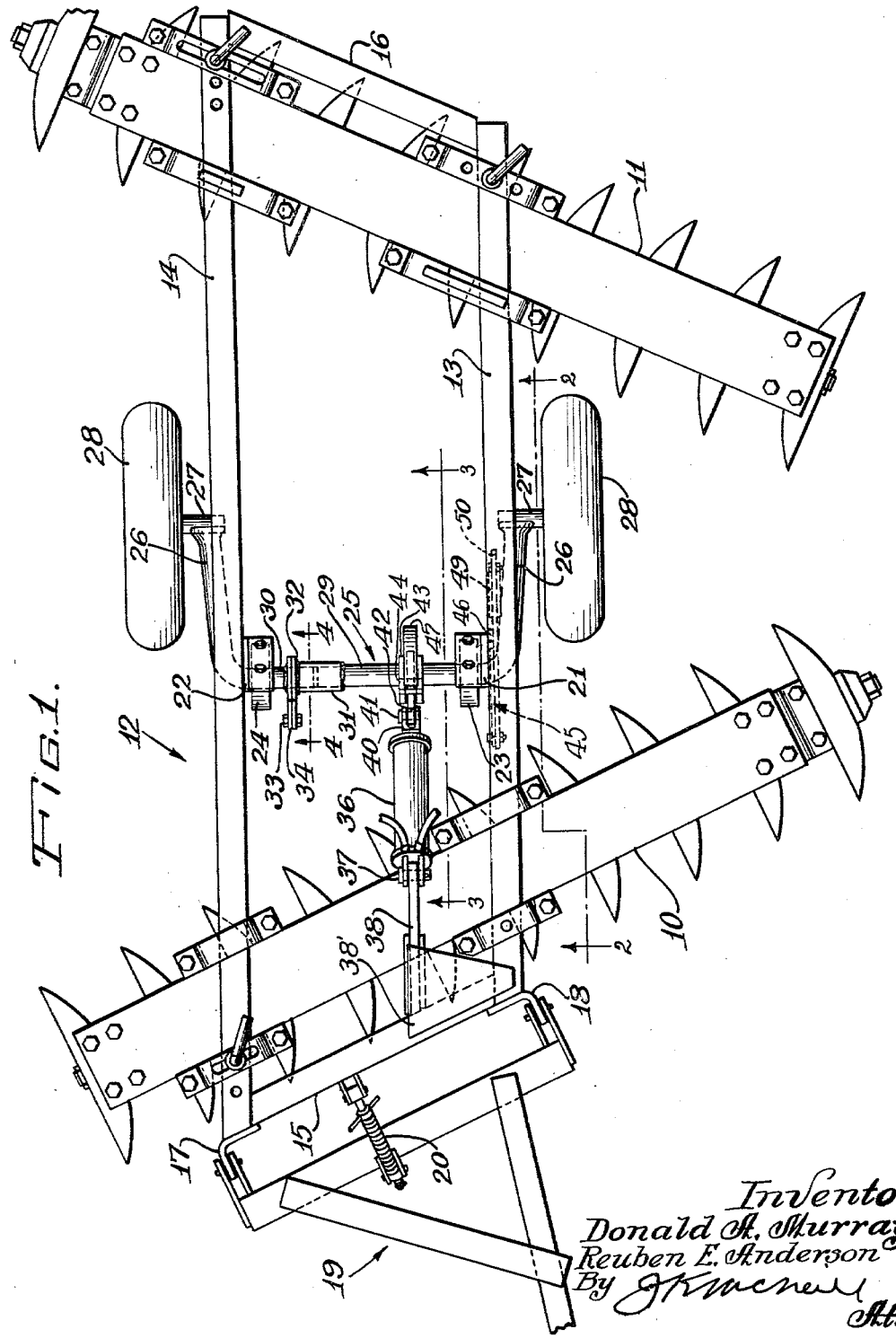
Inventors:
Donald A. Murray
Reuben E. Anderson
By
Atty.

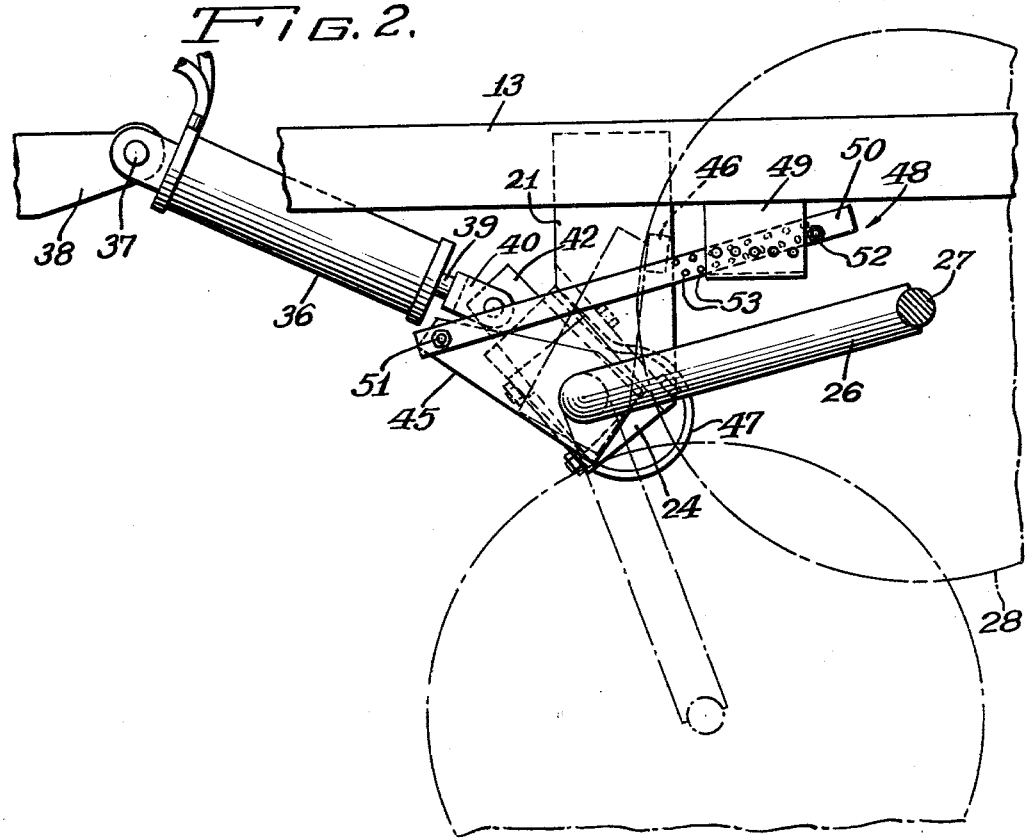
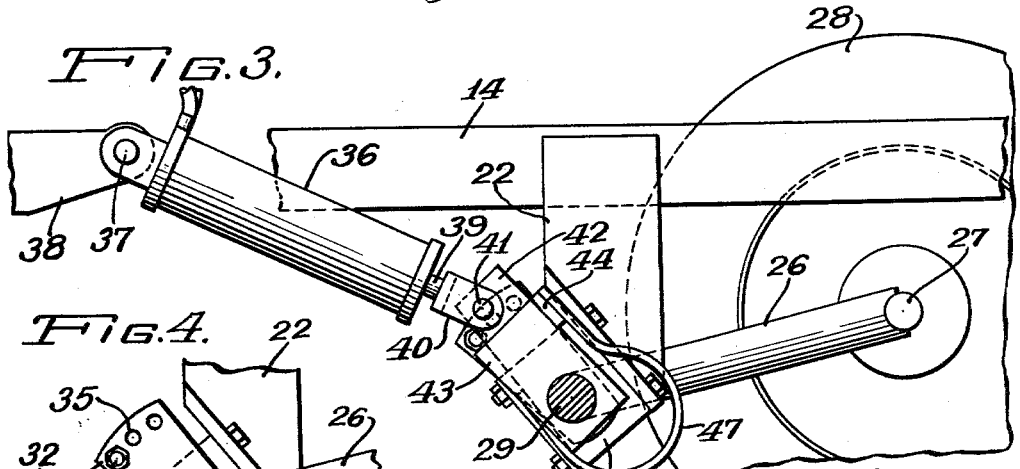
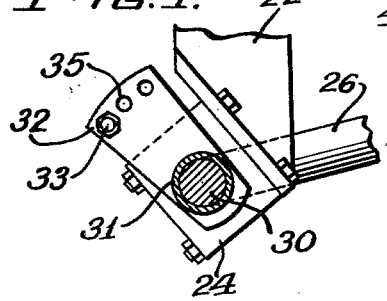

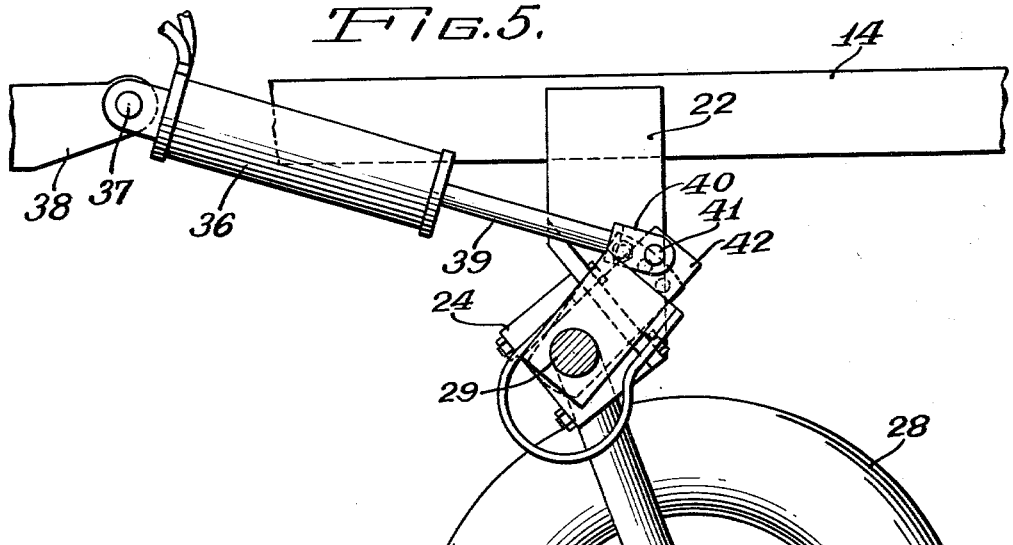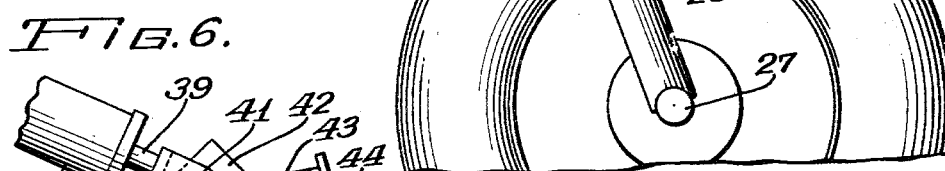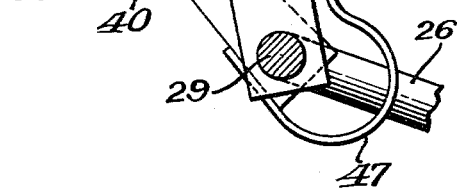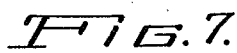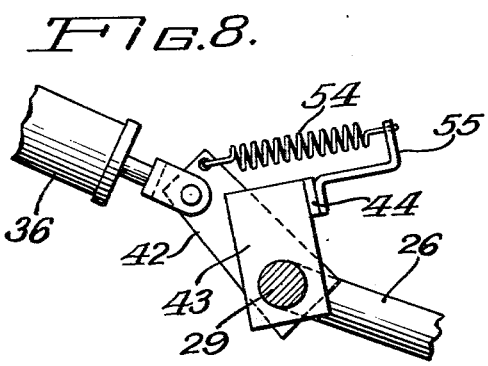

United States Patent Office 3,195,652
Patented July 20, 1965

3,195,652
DISK HARROW
Donald A. Murray, Stockton, and Reuben E. Anderson, Ripon, Calif., assignors to International Harvester Company, Chicago, Ill., a corporation of New Jersey
Filed Apr. 17, 1963, Ser. No. 273,774
3 Claims. (Cl. 172—414)

This invention relates to agricultural implements and particularly to lifting apparatus therefor. More specifically, the invention concerns an improved wheel controlled implement having novel means for controlling the movement of the wheels relative to the tool-carrying frame.

In an implement such as a disk harrow it is customary to mount the supporting wheels on crank arms at the end of an axle carried by the tool-carrying frame and to raise and lower the frame by rocking the axle about its axis to swing the wheels in a vertical plane. It is also customary to provide power transmitting means such as a hydraulic ram or cylinder on the frame connected to a fixed arm on the axle to rock the latter by operation of the cylinder. The wheels are swung downwardly to raise the frame and upwardly to allow the discs to penetrate the ground. In order to provide additional weight to hold the tools in the ground it has been proposed to continue rocking the axle until the wheels are above the ground and so add their weight to the frame. However, with the increasingly high pressure of hydraulic systems provided on modern tractors, great strength must be built into the moving parts of the implement and of the cylinder to withstand the force of the piston stroke.

Therefore, an object of this invention is the provision of improved control mechanism for the wheels of an implement having a tool-carrying frame adapted to be raised and lowered by the vertical movement of the wheels relative to the frame.

Another object of the invention is the provision of power operated means for controlling the vertical position of the wheels of a wheel controlled disk harrow or the like, and novel menas connecting the power operated means to the wheels.

Another object of the invention is the provision in a wheel controlled disk harrow or the like having an axle and an arm mounted thereon for rocking the axle, of power operated means on the frame and lost motion means in the connection thereof to the arm to minimize the danger of damage to the implement parts and to the power operated means.

Other objects and advantages of the invention will become clear from the following detailed description when read in conjunction with the accompanying drawings wherein:

FIGURE 1 is a plan view of a wheel controlled disk harrow of the offset type embodying the features of this invention;

FIGURE 2 is an enlarged section taken on the line 2—2 of FIGURE 1;

FIGURE 3 is an enlarged section on the line 3—3 of FIGURE 1;

FIGURE 4 is an enlarged section on the line 4—4 of FIGURE 1;

FIGURE 5 is a view similar to FIGURE 3 but showing the supporting wheel in the transport position of the machine;

FIGURE 6 is a sectional detail showing a position of the parts when the implement is in operation and the supporting wheels are on the ground gauging the depth of operation;

FIGURE 7 is a sectional detail showing the wheel in its transport position and with the hydraulic cylinder retracted; and FIGURE 8 is a view similar to FIGURE 6 showing a modified form of spring for connecting the control arms of the lifting apparatus.

While the control apparatus of this invention is adaptable to other types of implements, it is illustrated and described in its application to a disk harrow of the wheel controlled type. FIGURE 1 shows an offset disk harrow comprising front and rear laterally converging disc gangs 10 and 11 of any well-known construction adjustably mounted on a tool supporting frame 12 comprising laterally spaced bars 13 and 14, the latter being longer than bar 13 and connected thereto at front and rear ends by bars 15 and 16. Vertically extending angle bars 17 and 18 are affixed to the front end of the frame and serve for the pivotal attachment thereto of a hitch structure 19 resiliently connected to the bar 15 by spring means 20. The hitch structure 19 is connectable to a tractor or the like, not shown.

A pair of brackets 21 and 22 are affixed to and depend from the inner faces of bars 13 and 14 and have affixed thereto bearings 23 and 24 rotatably supporting an axle 25 having its ends bent rearwardly and downwardly to form crank arms 26, to the ends of which are affixed stub axles 27 upon which are mounted ground engaging wheels 28. Axle 25 is formed of two parts 29 and 30, part 29 having a sleeve 31 affixed thereto to the end of which is secured, as by welding, a radially projecting lug 32 adjustably secured by a bolt 33 to a mating lug 34 welded to axle section 30. Additional openings 35 are provided in lugs 32 and 34 to accommodate relative angular adjustment of axle sections 29 and 30 to vary the relative positions of the wheels 28.

For rocking the shaft or axle 25 to vertically swing the wheel carrying arms 26 to move the implement between earth working and transport positions, an extendable and retractable power transmission member in the form of a hydraulic ram or cylinder 36 is provided and pivotally anchored by a pin 37 to a bracket 38 mounted on a plate 38' affixed to the cross bar 15.

Piston rod 39, slidable in the cylinder, is provided with a clevis 40 pivotally connected by pin 41 with the upper end of a free arm 42 pivotally mounted on axle 25 between the side plates of a U-shaped fixed arm member 43 secured to shaft 25 and having a stop block 44 secured to the rear edges of said side plates and engageable by the free link or arm 42 upon extension of the piston rod in the cylinder.

A rock arm 45, also affixed to axle 25 near one end thereof, is engageable with a stop 46 secured to hanger 21 when the supporting wheels 28 have been swung downwardly to the dotted line position of the crank arm 26 shown in FIGURE 2 and the solid line position thereof shown in FIGURE 5.

The arms 42 and 43 are yieldably held together as a unit by a leaf spring 47 having one end affixed to arm 42 and bent generally into a U-shape with the other end of the spring engaging the abutment block 44 on fixed arm 43. Spring 47 exerts a force to hold arms 42 and 43 together to rock as a single unit upon actuation of cylinder 36 to swing wheels 28 in a vertical plane to raise and lower the implement frame.

The ground engaging position of the wheel arms 26 during earth working, in which position the wheels 28 are utilized to gauge the operating depth of the discs, is indicated in FIGURES 6 and 8. This ground engaging position of the wheels is adjustable and is determined by any suitable stop mechanism such as indicated at 48 and comprising a U-shaped bracket 49 affixed to and depending from beam 13 between the side plates of which is slidably received a strap 50 the forward end of which is pivotally connected at 51 to the upper end of rock arm 45 which, along with fixed arm 43, is rigidly secured to axle 25. A bolt 52 is received in a selected one of a plurality of openings 53 in strap 50 and engages the rear edge of bracket 49 to limit the upward swinging of wheel arms 26.

When wheel 28 is swung counterclockwise upwardly to the elevated dotted line position of FIGURE 2 wherein the weight of the wheels is utilized to hold the implement in the ground, the extent of movement in this direction is limited by the adjustable stop comprising bolt 52 carried by link 50, and bracket 49. Stop 49, 52 is operatively engageable through link 50 and arm 45 with fixed arm 43 to limit said movement of the fixed arm in a counterclockwise direction.

The engagement of bolt 52 with bracket 49, of course, stops arm 43, but by virtue of the flexibility of spring 47, additional movement of free arrm 42 in a counterclockwise direction as viewed in FIGURE 2 may take place to accommodate the retracting force of cylinder 36.

The spring connection between arms 42 and 43 permits wheels 28 to be lifted to the position of FIGURE 2 by swinging arms 42 and 43 counterclockwise to permit the weight of the wheels to be added to the implement to hold it to its work, and spring 47 yields to accommodate additional movement of arm 42. Extension of piston rod 39 in cylinder 36 rocks arms 42 and 43 clockwise, as viewed in FIGURE 2, to move said arms and wheel 28 to the dotted line or transport position. Further clockwise swinging of the wheel is limited by engagement of arm 45 with stop 46.

The lost motion provided between arms 42 and 43 also makes it possible, if desired, to retract the cylinder after the implement has been moved into its transport position by lowering the wheels to the positions indicated in FIGURES 5 and 7.

In the modified form of the invention shown in FIGURE 8, like parts are represented by like numbers as in the remainder of the drawings, an extension spring 54 being anchored at one end to the upper end of arrm 42 and at its other end to a bracket 55 affixed to block 44 on arm 43.

It is believed that the construction and operation of the novel lifting and control apparatus of this invention will be clearly understood from the foregoing description.

It should likewise be understood that the invention has been described in its preferred embodiment only, and that modifications may be made therein without departing from the spirit of the invention or the scope of the appended claims.

What is claimed is:

1. In a trailing implement having a tool-carrying frame and a wheel-carrying axle mounted on the frame for rocking movement to vertically move the wheels from a lowered to a raised position relative to the frame, a fixed arm secured to the axle, a free arm rockably mounted on the axle, an extendable and retractable power transmitting member anchored at one end to the frame and connected at its other end to said free arm for rocking the latter, means forming an abutment on said fixed arm engageable with said free arm upon rocking the latter in one direction to lower the wheels relative to the frame, yieldable means forming a connection between said fixed arm and said free arm and effective upon rocking said free arm to also rock said fixed arm in the other direction to raise the wheels relative to the frame, and means acting between said axle and the frame to limit the rocking of said fixed arm in said other direction, said yieldable means being yieldable to accommodate additional rocking of said free arm relative to the fixed arm in said other direction.

2. The invention set forth in claim 1, wherein said yieldable means is a bent leaf spring having one end anchored to one of said arms and having its other end operatively engageable with the other of said arms to bias said arms together with the free arm engaging said abutment during normal rocking movement of the axle.

3. The invention set forth in claim 1, wherein said yieldable means is an extension spring having its ends connected to the respective of said arms.

References Cited by the Examiner

UNITED STATES PATENTS 2,797,542    7/57    Webster et al. _____ 172—413 X
2,939,539    6/60    Kramer _____ 172—413 X T. GRAHAM CRAVER, *Primary Examiner.*